Figure 1:
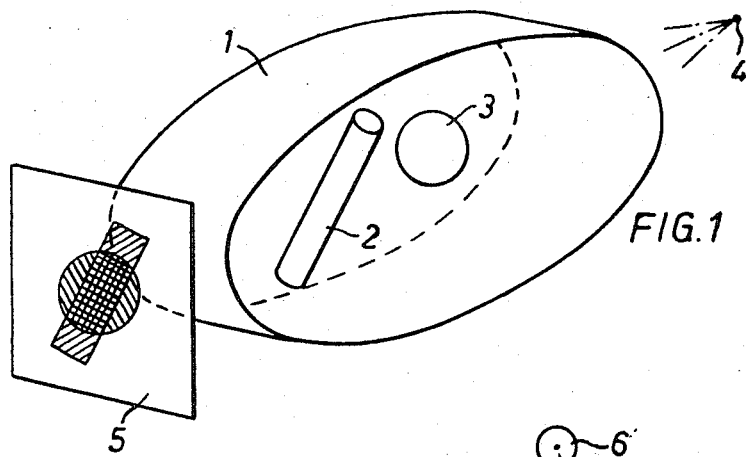

United States Patent [19]
Hounsfield

[11] 3,778,614
[45] Dec. 11, 1973

[54] METHOD AND APPARATUS FOR MEASURING X- OR γ-RADIATION ABSORPTION OR TRANSMISSION AT PLURAL ANGLES AND ANALYZING THE DATA

[75] Inventor: Godfrey Newbold Hounsfield, Winthorpe Aerodrome Farm, near Newark, England

[73] Assignee: EMI Limited, Hayes, Middlesex, England

[22] Filed: Dec. 27, 1971

[21] Appl. No.: 212,778

Related U.S. Application Data

[63] Continuation of Ser. No. 861,538, Aug. 21, 1969, abandoned.

[30] Foreign Application Priority Data
Aug. 23, 1968 Great Britain.................. 40,317/68

[52] U.S. Cl................250/362, 250/363, 250/366
[51] Int. Cl. ........................................... G01n 23/08
[58] Field of Search...................... 250/52, 61.5, 105

[56] References Cited
UNITED STATES PATENTS

| | | | |
|---|---|---|---|
| 3,106,640 | 10/1963 | Oldendorf............................ | 250/52 |
| 3,158,744 | 11/1964 | Bernstein............................ | 250/52 X |
| 3,432,657 | 3/1969 | Slavin ................................. | 250/52 X |
| 2,557,868 | 6/1951 | Fua et al............................. | 250/52 X |
| 3,091,692 | 5/1963 | Verse.................................. | 250/61.5 |
| 3,179,800 | 4/1965 | McNamara .......................... | 250/52 |

Primary Examiner—William F. Lindquist
Attorney—William W. Downing, Jr.

[57] ABSTRACT

In apparatus for examining a body by means of X or Y radiation, a two-dimensional matrix of elements of the body is exposed to radiation from a number of directions and the transmission of the radiation by a plurality of paths of small cross-sectional area through the body is measured, the directions and numbers of the paths being such that each element of the matrix is intersected by a group of paths which intersect different groups of elements. From these measurements, the absorptions or transmissions in of the individual elements of the matrix are calculated and used to produce a cathode ray tube display and/or a photograph.

28 Claims, 21 Drawing Figures

PATENTED DEC 11 1973 3,778,614

SHEET 1 OF 5

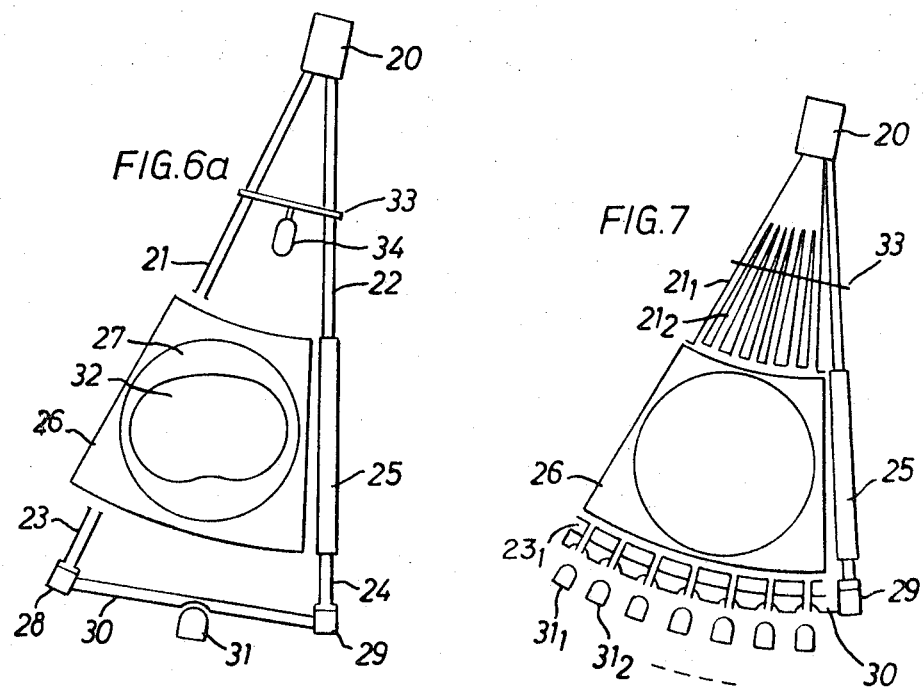
FIG.6a
FIG.7
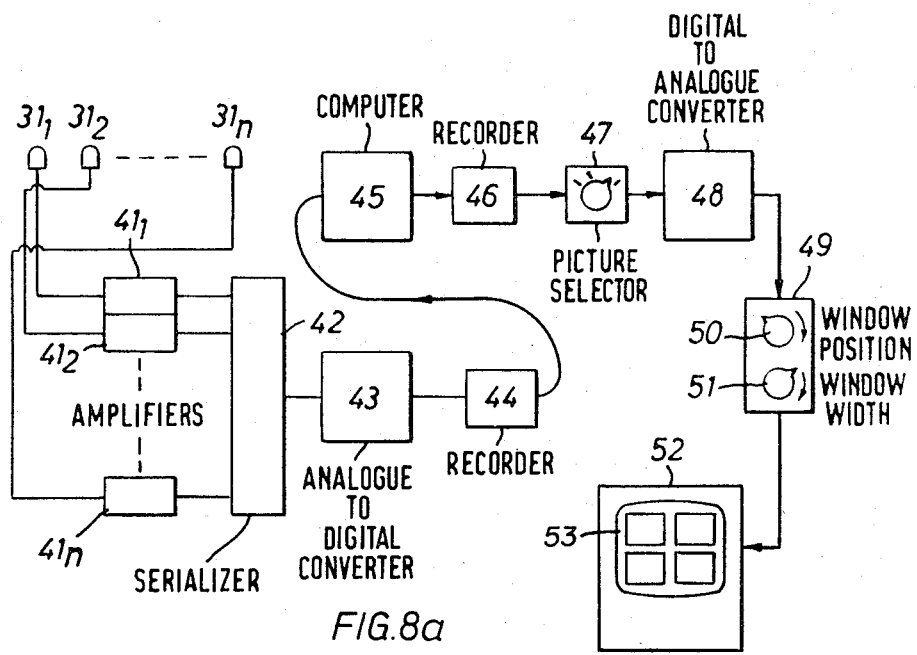
FIG.8a

METHOD AND APPARATUS FOR MEASURING X- OR γ-RADIATION ABSORPTION OR TRANSMISSION AT PLURAL ANGLES AND ANALYZING THE DATA

This is a continuation of application Ser. No. 861,538, filed Aug. 21, 1969, now abandoned.

This invention relates to a method of, and apparatus for examining a body by means of radiation such as X or γ radiation.

The method and apparatus according to the invention can be used to produce radiographs in any convenient form, such as a picture on a cathode ray tube or other image forming device, a photograph of such a picture, or a map of absorption coefficients such as may be produced by a digital computer and on which "contours" may subsequently be drawn.

It is well known that when an X-ray picture is taken through an object, the three-dimensional interior appears only as a two-dimensional picture, the details from front to back of the object appearing superimposed and the picture being consequently confused and difficult to interpret. For example, if the object were a book, a conventional X-ray picture would reveal little about the contents, as the information on any one page could not be extracted from the superimposed information from all the other pages. A method of carrying out examination of a body by X-radiation known as tomography has been proposed with a view to reducing this disadvantage. In this method, a source of radiation is orbited relative to the body being examined, about an axis in or near the body, while a plate or other screen sensitive to radiation transmitted through the body is displaced in such a way that the elements in one plane of the body remain substantially stationary. This method has however the disadvantage that the shadows of elements on other planes of the body move and this movement not only obscures the information about the selected plane, but results in a loss of information about the other planes.

It has also been proposed to map the absorption coefficient of a two dimensional slice of a body from a knowledge of the line integral of the absorption coefficient along all lines intersecting the slice, by a process involving the application of Fourier inverting techniques. This proposal is described in a paper entitled "Representation of a Function by its Line Integrals, with some Radiological Applications" by A.M. Cormack (Journal of Applied Physics, Volume 14, Number 9, pages 2722 to 2727 and Number 10, pages 2908 to 2913). An experimental test was carried out on a special model, each line integral used in the evaluation being derived by letting a fine beam of γ-rays of known intensity be incident on the slice and deriving a signal representing the integral along the line of the beam from the γ-rays emerging from the body. The method described in this paper is capable in theory of yielding a unique principal solution, but is nevertheless complicated, has limited practical application and liable to error in the practically feasible forms.

It has also been proposed in a paper entitled "Transmission Scanning; A Useful Adjunct to Conventional Emission Scanning for Accurately Keying Isotope Deposition to Radiographic Anatomy" by D.E. Kuhl M.D., John Hall Ph.D., and W.L. Eaton M.D. (Radiology, 1966, Volume 87, pages 278 to 284) to scan a section of a body by moving a small radio active source of either $Am^{241}$ or $I^{125}$ so as to follow the motion of a detector at the other side of the body. It is understood that a representation of the section similar to a roentgenogram was produced by causing a thin line of light to be generated across the face of an open-shutter oscilloscope to represent the line of view of the detector. The line of light was moved across the oscilloscope face to correspond to the detector motion, and the film holder rotated step-wise to correspond with the angle of the detector. The brightness of the line of light was varied according to the counting rate from the detectors so that the film ultimately recorded a picture built up from a series of overlapping lines of varying brightness. This method was applied only to a relatively small number of angles of view and it will be appreciated that the density of each picture point was affected by all other picture points traversed by the beam.

One object of the present invention is to provide a relatively simple method and apparatus for examining a body by means of penetrating radiation which is able to detect quite small differences in the transmissions or absorptions of element in a planar slice of the body.

Another object of the invention is to provide an improved method of, and apparatus for, examining a body by means of penetrating radiation which is able to provide an accurate representation of elements of the body without the need to administer radio opaque contrast media as in angiography.

Another object of the present invention is to provide an improved method and apparatus whereby a radiographer, working unaided, can obtain representations of sectional slices of a body relatively quickly.

Another object of the present invention is to provide an improved method of, and apparatus for, producing representations of cross sectional slices of a body which substantially avoids the disadvantages of the attenuating effects of bone and other matter, which can operate with high resolution, and which reduces disadvantages due to scatter.

With these and further objects in view, the invention provides, in general terms, a method of examining at least part of the interior of a body using penetrating radiation such as X or γ rays, comprising the steps of:

a. transmitting radiation from an external source through the body in a plurality of rays traversing a plurality of respective paths at an initial angle or initial mean angle, said rays constituting a first set of rays in a single planar slice of said body, the cross-sectional dimensions of each ray being small in relation to the dimensions of the body;

b. transmitting radiation from said external source through the body in further sets of rays similar to said first set of rays, said further sets being disposed in said planar slice at angles or mean angles different from each other and from said initial angle or initial mean angle;

c. the sets of rays being such that every element of a two-dimensional matrix of elements of the body in said planar slice is intersected by a group of said rays, the group of rays being different for the different elements of the array;

d. deriving from each ray emerging from the body an output signal representing the sum of the transmissions or absorptions in the elements of the body intersected by the ray, thereby to derive sets of output signals corresponding to the sets of rays sufficient to obtain the transmission or absorption of each element of said matrix;

e. deriving from said output signals, by a process of successive approximations, resultant signals representing the transmissions or absorptions of the elements of said matrix, the derivation of said resultant signals including the steps of i. deriving a difference signal responsive to the difference between each output signal and its reconstruction from the last approximations to said resultant signals, and
  ii. adjusting the approximations to the respective resultant signals in response to said difference signal, f. producing in response to said resultant signals a representation of the transmissions or absorptions of said elements of the slice of the body.

Figure 2A:
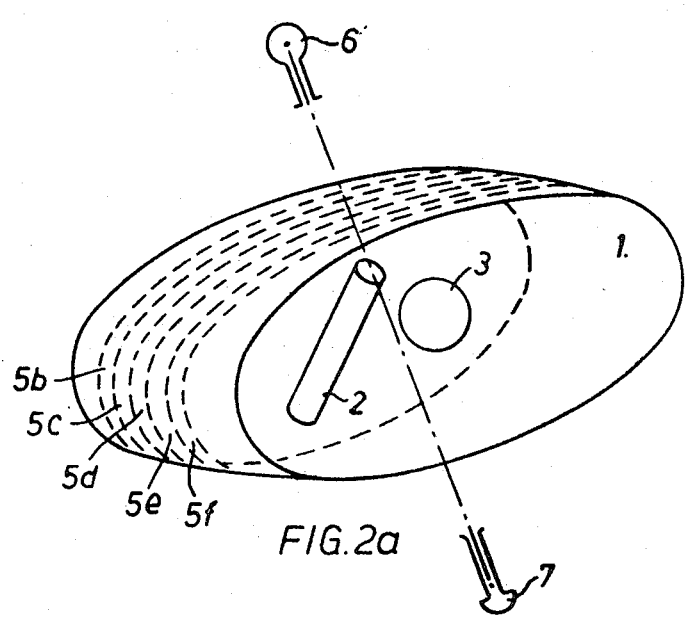
Figure 2B:
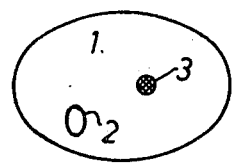
Figure 2C:
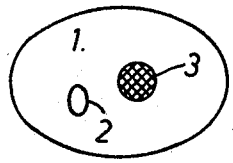
Figure 2D:
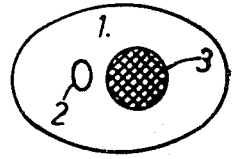
Figure 2E:
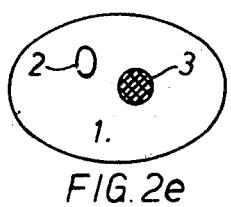
Figure 2F:
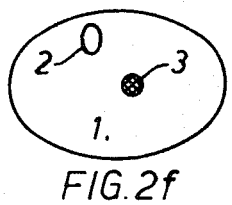
Figure 3:
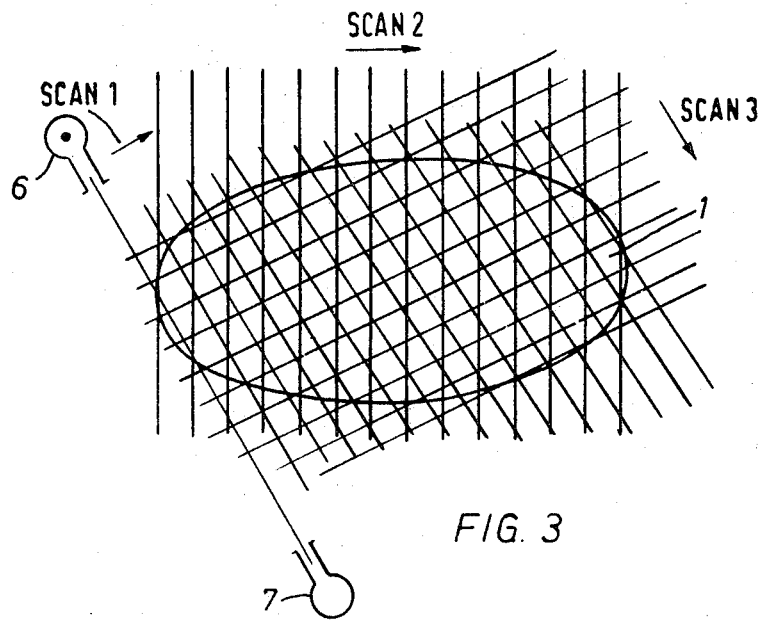
Figure 4:
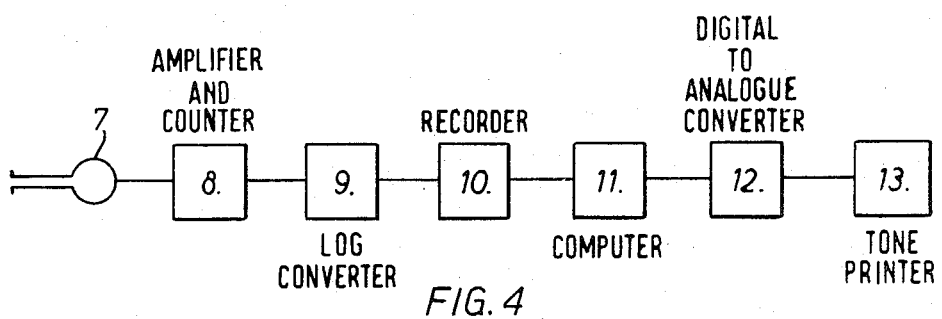
Figure 5:
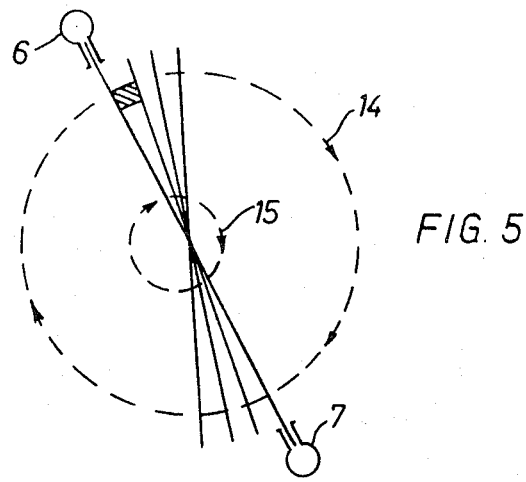
Figure 6B:
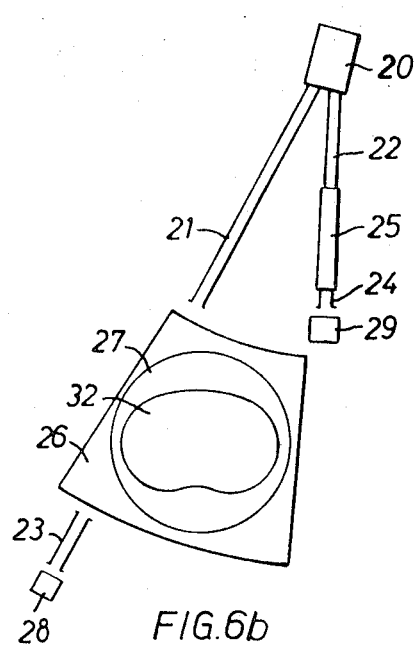
Figure 8B:
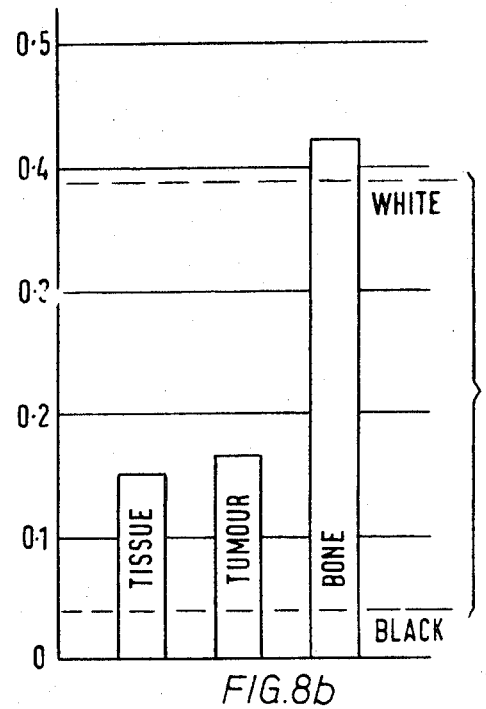

The present invention also provides apparatus capable of being used for carrying out the aforesaid inventive method of examining a body In order that the invention may be clearly understood and readily carried into effect, the same will now be described with reference to the accompanying drawings in which:

FIG. 1 shows the kind of picture produced by conventional X-ray apparatus,

FIGS. 2a, 2b, 2c, 2d, 2e, and 2f illustrates the principle of the invention and the kind of picture produced by the invention, FIG. 3 shows one method of scanning used in the invention, FIG. 4 shows in block form suitable apparatus for carrying out the invention, FIG. 5 shows an alternative method of scanning, FIGS. 6a and 6b illustrates diagrammatically the construction of the scanning means of apparatus according to two other examples of the invention, FIG. 7 illustrates a modification of FIG. 6a, FIG. 8a illustrates, partly in block form, the apparatus embodying the scanning means illustrated in FIG. 7, FIGS. 8b, 8c and 8d are diagrams useful in explaining the operation of parts of the apparatus shown in FIG. 8a, and FIGS. 9a, 9b, 9c and 9d illustrates the application of weighting factors to elements of the picture.

Referring to FIG. 1, this shows a body 1 containing a bone 2 and a tumour 3. Also shown are a source of X-rays 4 and a X-ray film 5. As can be seen, images of the bone and tumour are produced on the film, but partly superimposed. The tone of any point on the film is dependent on the product of the co-efficients of transmission of all the elements lying between that point and the X-ray source. Thus if the bone 2 has the lowest co-efficient of transmission, the tumour 3 the second lowest and the surrounding material the highest, the X-ray image comprises a dark patch where the bone and tumour are superimposed, a lighter patch due to the bone not superimposed on the tumour and a still lighter patch due to the tumour not superimposed on the bone. These are surrounded by a light area where neither bone nor tumour is present. Also has the differences between the coefficients of transmission of tumour and normal tissue are small, the differences in tone between the different parts of the X-ray picture are slight and difficult to detect using such a method.

Referring now to FIG. 2a, the body, bone and tumour are denoted by the same references as in FIG. 1. The X-ray source is replaced by a source 6 which may also be of gamma rays but is preferably of X-rays. It differes from source 4 in that it produces a beam of small cross section area, for example 3m.m square or diameter, and preferably includes a collimator to reduce scatter of the rays. The X-ray film 5 has been replaced by a detector 7, which may be a scintillator and a scintillation counter and which preferably also includes a collimator. The body 1 is scanned by the beam in one plane only, the plane being 3m.m. thick in this example, in a direction not only linearly across the plane, but at a plurality of angles round the plane, the detector 7 being so mounted that it is always pointing towards the source 6. FIG. 3 illustrates the scanning in more detail. If only a single scan across the plane were performed, the result would merely be equivalent to a conventional X-ray picture of that plane, all the objects on a line between source 6 and detector 7 being superimposed. However by performing a large number of scans, sufficient information can be derived to enable the coefficient of absorption of the material in each 3m.m. cube of material in the plane to be calculated and the co-ordinates of its position in the plane determined. Although only three scans are shown in FIG. 3, it will be appreciated that many more would be required in practice.

In each position of the beam the detector 7 determines the transmission of the X radiation by a path of relatively small cross-sectional area through the body. The plane under examination is regarded as a two dimensional matrix of elements and the directions and numbers of the paths is such that each element of the matrix is intersected by a group of paths, which paths intersect different groups of elements.

From the transmissions by all the paths, a series of simultaneous equations is built up represented by the discrete output signals derived from the radiation traversing all the respective paths and the solution of these equations by means of a digital computer provides the absorption coefficient of each element of the matrix. The outputs of the computer may be used to produce a picture or other representation of the section in any convenient form. Successive parallel planes may be examined in this way, and a picture of each planar slice produced to build up a picture of the entire body or a larger section of it. The slices may be examined in sequence or simultaneously by using a number of X-ray sources and detectors in parallel. FIGS. 2b to 2f show the pictures resulting from examination of planar slices 5b to 5f of body 1.

FIG. 4 shows a block diagram of the apparatus for producing pictures from the outputs from detector 7. The output from detector 7 is applied to an amplifier and counter 8 which produces a digital output representing the number of counts in each reading. The output from 8 is converted to logarithmic form in a logarithmic converter 9 whose couput is stored in a punched-tape or magnetic tape recorder 10 before being transmitted to a digital computer 11 for processing. The computer 11 produces for each 3m.m. cube of a planar slice of body 1 a digital number representing the absorption coefficient of the material within that cube. These digital numbers may be converted to analogue form in digital-to-analogue converter 12 and applied to a tone printer 13 to produce a picture. Alternatively, the computer outputs may be retained in digital form for comparison by pattern recognition techniques, with other digitised pictures.

To achieve the required result, the absorption along each path is deduced from the transmission by each path and a knowledge of the initial intensity of the beam or ray entering each path. The logarithmic converter 9 is used to provide a linear output so that the total absorption along a path is equal to the sum of the absorption in each small element along the path. Let 100 parallel paths be used for each of 400 directions spaced equally over 180°. The computer 11 has then 40,000 figures to process, each representing the total absorption along a given path. Consider the section divided into 100 × 100 similar meshes as on Cartesian graph paper. Each mesh represents an element of the body, but the term mesh will be used in the following mathematical consideration for convenience. The computer 11 is then programmed to give the absorption for each of the 10,000 meshes.

Consider a ray which passes through a set of $n = 100$ meshes through none of which a ray has previously passed. Let the total absorption be Z dB. The computer then allocates a provisional value of $Z/100$ to each of the meshes. Now suppose that, at a later stage, a ray passes through another set of 100 meshes the absorption in some or all of these meshes having already been allocated. Let the sum of the figures already allocated be $Z_1$ whereas the new measurement gives a total absorption $Z_2$. It will be appreciated that $Z_1$ constitutes a reconstruction of the output signal $Z_2$ derived from the last approximation to the absorptions of the respective meshes. Then a correction $(Z_2 - Z_1)/100$ is added to the figures already appearing in each of the meshes. This process is then continued as successive approximations for all the 40,000 rays. This process gives a rough approximation, but to obtain better accuracy, the computer must repeat it a number of times, say five.

Consider a single section of the body in the $xy$-plane in which the absorption per unit distance in dB at the point $x, y$ is $z$. Let $z = f(x,y)$. Now consider a single set of rays all parallel to the $y$-axis and spaced equally by intervals $\Delta x$. The rays are arranged to have a width rather greater than $\Delta x$ so that some overlapping occurs. The optimum beam width is determined empirically. For mathematical purposes it is assumed that the change of absorption through any interval $\Delta x$ to be negligible. We now suppose that the section of the body to be examined is bounded on two sides by the $x$- and $y$-axes and is square in shape so that it can be divided into elementary squares with edges parallel to the axes.

The complete total of rays can be divided into sets each of which consists of parallel rays or effectively parallel rays at a given angle or mean angle. The sets of discrete output signals derived from the rays in each set are treated in the computer in sequence. However, since there are only about 100 × 100 meshes and about 400 angles are employed within 180°, rays at neighbouring angles must include some of the same squares and their absorption will not, therefore, be independent. If the sets were therefore taken in angular succession the lack of independence would clearly lead to a slower convergence than if they were independent.

The computer is therefore arranged, by programming, to take the different angular sets in a pseudo random order with large angular gaps, of say 40°, between successive sets of rays. The sequence is intended to ensure that every angle is included, but not repeated, within the 400 directions. Rays close together in angle then appear far apart in the computer scanning sequence.

The accuracy of detection by detector such as 7 is limited so that the raw data contain errors and therefore, as the complete cycle of 100 × 400 measurements is analysed 4 or 5 times by the computer, the resultant figures for the meshes tend to oscillate. It has been found that this can be avoided by multiplying the later corrections by a factor which is less than unity and falls steadily for successive cycles.

The procedure may be represented mathematically as follows. The true continuous distribution function is given by equation (1)

$$z = f(x,y) \quad (1)$$

Let the distribution function reached at some stage of the work be $$z' = g(x,y) \quad (2)$$

which is a discontinuous function since $z'$ must have the same value over each mesh.

Now consider an arbitrary ray passing through $n$ meshes. If $z_r$ is the mean value of $z$ through the $r$ th mesh and Z is the total absorption (or attenuation) of the ray in dB as measured $$Z = \sum_1^n z_r \quad (3)$$

The value of $z'$ for each mesh will also be known from the previous work. If no ray has passed through a given mesh $z'$ is put equal to zero.

The mean square error for all the meshes along the path of the ray will be written E where $$nE = \sum_1^n (z'_r - z_r)^2 \quad (4)$$

and it is required to choose new values $z''_r$ to replace $z'_r$ in order to minimise E.

There is no reason to favour one mesh rather than another, and therefore a constant C is added to $z'_r$ where C is independent of $r$ and must be obtained from the additional information provided by Z. Hence $$z''_r = z'_r + C \quad (5)$$

Hence the new value of $n$ E will be $$nE = \sum_1^n (z''_r - z_r)^2 = \sum_1^n (z'_r - z_r + C)^2 \quad (6)$$

The minimum value of E is obtained where C is equal to the mean value of $z_r - z_r'$ or $$C = \frac{\sum_1^n (z_r - z'_r)}{n} = Z/n - \frac{\sum_1^n z'_r}{n}$$

Hence $$z''_r = z'_r + Z/n - \frac{\sum_1^n z'_r}{n}$$

In other words the correction applied is equal to the mean value of the error. If none of the n meshes has previously appeared all the $z'_r$ are put equal to zero so that $$z''_r = Z/n$$

(9)

In other words the attenuation is, at first, uniformly distributed among the meshes.

For the s th ray equation (8) becomes $$z''_{rs} = z'_{rs} + Z_a/n - \frac{\sum_{r=1}^{n} z'_{rs}}{n}$$

If there is a total of S rays there will be a total of S equations for a complete cycle. If m is the number of rays in a set of parallel rays and N is the number of angles $$S = m N$$

(11)

If $q$ is the number of complete cycles used by the computer, the total number of ray operations is $q$ S.

Since the number of rays S per cycle is several times the number of meshes M, the number S of equations will be several times the number M of independent equations.

Difficulties arise in finding a system which traces through the picture matrix an equivalent beam or ray as it has been called heretofore which has effectively constant width, and which also includes the correct number of picture elements along its length. both of these requirements are essential for the accurate computer calculations which are to follow.

Figure 9A:
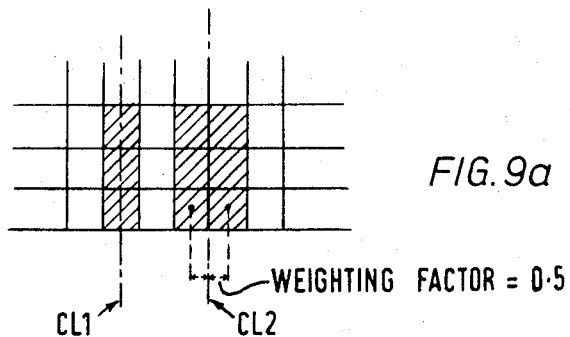

The two worst cases are shown in FIG. 9a, where in one case a beam centre line CL1 passes through the squares of the matrix perpendicularly and the centre line of the beam passes through the centre of the squares; in the other case the beam centre line CL2 passes between the squares. The latter case would add up to twice as many squares as the former, when the squares along the length of the beam are added up, and would clearly give an error of 2:1.

In order to overcome the above problem the values in each square are multiplied by a weighting factor which is a function of the distance from the centre of the square to the centre line of the beam, i.e., the squares of beam 2 in FIG. 9a would have a weighting factor of 0.5, the resulting sum of the numbers in the two beams then being equal.

Figure 9B:
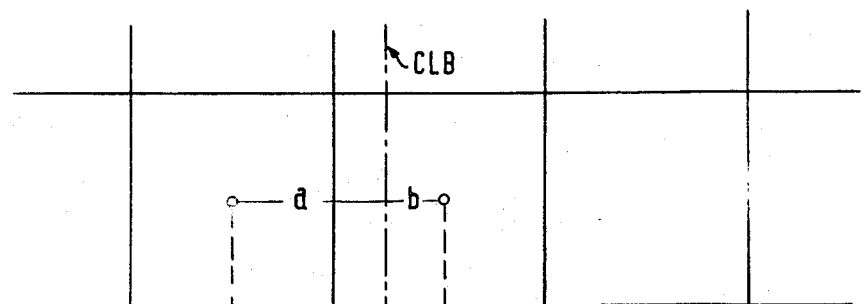

FIG. 9b shows an intermediate position of the beam in which the distances from the centre line CLB of the beam to the centres of the two affected squares in the beam are $a$ and $b$ respectively. The corresponding weighting factors A and B can be read off the graph, and when these are added together they must for reasons indicated above add up to unity. Therefore it follows that the parts of the curves labelled $x$ must be drawn the inverse of the parts labelled $y$, if the beam and hence the weighting curve is to be considered symmetrical about its centre line.

Figure 9C:
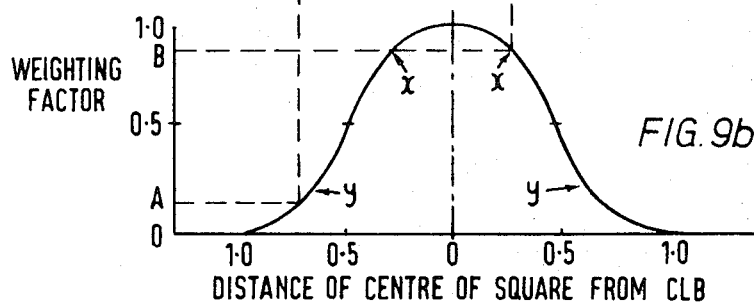
Figure 9D:
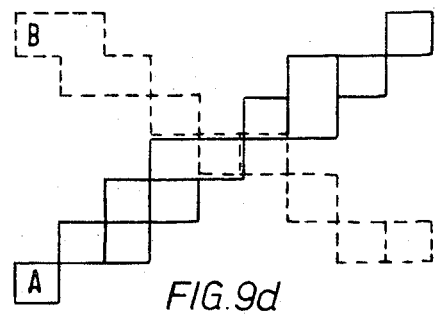

It can be shown that one requirement for accurate summation of values of the matrix squares is idealised in FIG. 9c and its practical equivalent is shown in FIG. 9d using a matrix with a beam at the same angle.

In FIG. 9c the area abcd is obviously constant at any position of the intersection of the beams and is a function of the angle of intersection of the two beams A and B. In FIG. 9d the two equivalent beams vary in width from one to two squares and a constant area at intersection would be impossible without the use of weighting factors. It can be shown that for a given X-ray beam width there is one weighting curve which fulfils all the requirements. For example, if the squares contained at the intersection of the beams in FIG. 9d are multiplied by their respective weighting factors taken from this curve, they will produce a sum which is proportional to the area abcd in FIG. 9c. Any angle of intersection may be chosen and the beam in FIG. 9b may be intersected anywhere along its length for this condition to remain true.

The weighting factor curve can be split up into a table of approximately 20 values to which the computer can refer during calculations without substantially impairing the accuracy of the system.

In the example illustrated in FIG. 3 only a single detector 7 is indicated. If however a fan-shaped or strip beam of radiation is used, with a group of detectors each for receiving radiation transmitted by one of the paths of small cross sectional area, some correction may have to be made in solving the equations for the effect of Compton scatter but in many cases this can be avoided by adequate spacing of the detectors.

As was previously mentioned, the differences in absorption between different materials is very small. However, in accordance with the invention the contrast of the picture produced can be so arranged that the full black to white range represents only the small range of absorption values which is of interest.

It is essential in all X-ray apparatus to ensure that the patient does not receive an overdose of radiation. In this respect the use of a scintillator and a scintillation counter is advantageous as its efficiency and accuracy in detecting X-rays are several orders better than those of photographic film. The maximum detail obtainable in a picture is a function of the number of counts per reading received by the scintillation counter around the edge of the body. In view of the limitation on the permissible number of counts per reading, it would not be feasible to produce a picture having the same order of definition as a television picture when examining a living body, although a high definition picture of an inanimate object could be produced. Moreover, in examining living bodies, it is not normally necessary to have a high definition picture of the whole body. Apparatus according to the invention can be used to produce a picture which is of high definition in the area of immediate interest and of low definition in surrounding areas. For example, as shown in FIG. 5 the radiation source 6 and detector 7 may be arranged to perform a circular scan indicated by the arrow 15 round the edged of the body, which is so positioned that the area of interest is near the centre of the scan. By averaging the number of counts over a small angle of rotation, mean values of absorption for areas enclosed by the angle such as the area shown shaded, may be calculated. It is clear from FIG. 5 that near the edges of the body only a relatively small number of large area elements are being examined, whereas at the centre a large number of small area elements is examined. Consequently the resulting picture will have a high definition near the centre and a low definition towards the edges. In producing the picture, the points may conveniently be plotted in polar co-ordinates. As in the example of FIG. 3, a large number of scans is required to produce sufficient information. In the embodiment of FIG. 5, the additional scans may be produced by superimposing a slower rotary motion which shifts the axis of the main rotation so that the centre of the circle of the main scanning motion traces a circle of small diameter. This additional scanning motion produces the intersecting paths for each element of the matrix according to which the body is examined. The superimposed motion need not be circular and need not be confined to the centre circle. For example it could be a spiral starting at the edge of the outer circle progressing rapidly towards the centre then performing a slow spiral in the region of the centre. It may be more complicated provided that it achieves the object of even coverage at the centre.

Referring to FIG. 6a of the drawing there is represented therein an X-ray tube 20 from which the rays, when the tube is operating, pass through two collimators 21 and 22. The collimator 21 is aligned with a further collimator 23 and the collimater 22 is aligned with a further collimator 24. Between collimator 22 and 24 is located a dummy attenuator 25. There is a gap between the collimators 21 and 23 for the location of the object to be X-rayed and in the example illustrated this gap is occupied by a plastics block 26 having a central aperture 27 for the body to be X-rayed. The plastics material may be for example that known as perspex. Two scintillators 28 and 29 are located at the ends of the collimators 23 and 24 respectively and these communicate via a light pipe 30 with a photomultiplier 31. A chopper 33 rotatable by an electric motor 34 is arranged to allow beams to pass through the collimators 21 and 22 only alternately to produce scintillations in the scintillators 28 and 29 for detection by the photo-multiplier 31. When the apparatus is in use, the collimators 21 to 24, the attenuator 25, the scintillators 28 and 29, the light pipe 30 the photo-multiplier 31, the chopper 33 and the motor 34 are oscillated through the angle subtended by the block 26. The X-ray source 20 does not take part in this oscillation because it produces a beam wide enough to span the block 26. However the whole equipment is arranged to rotate slowly about the body to be examined by X radiation. Such a body is represented by the outline 32.

The use of the scintillator 29 and the attenuator 25 provides a reference for the photo-multiplier 31. The material of the attenuator 25 is selected to have similar absorption properties to the body 32 to be examined so that accurate transmission readings may be obtained from the X radiations which pass through this body substantially independent of the X-ray source intensity. The material in the dummy attenuator 25 compensates, to some extent for the X-ray tube spectrum drift. The space 27 between the body and block 26 is filled with a bag containing water so that the beam intensity received by the scintillator 28 is kept as constant as possible as it traverses the body 32, thus reducing the range of the readings which the photo-multiplier 31 has to handle. The apparatus may be calibrated initially by inserting a round homogeneous body in the aperture of the block 26. FIG. 6b is a similar system but the chopper is discarded and two separate detectors are used for measuring the sources and readings through the body.

Figure 8C:
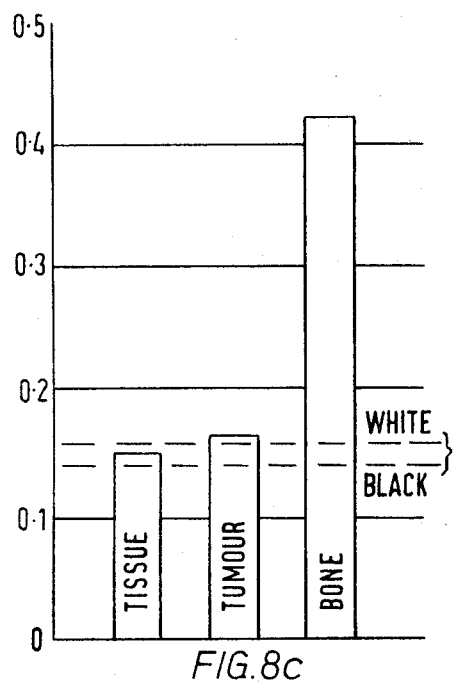
Figure 8D:
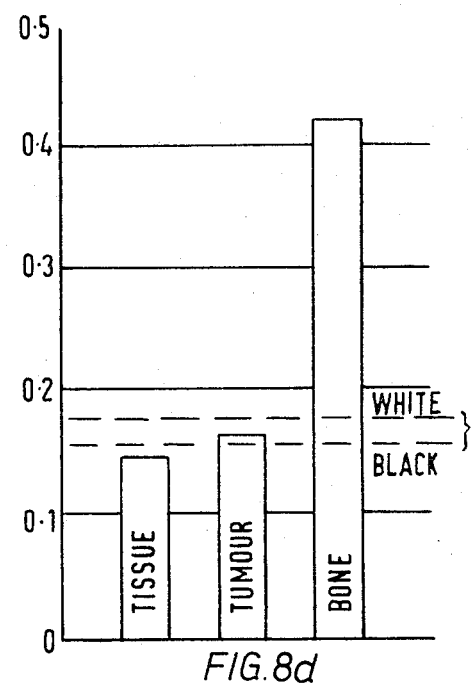

The modification of FIG. 6a which is illustrated in FIG. 7 is intended to reduce the time required to complete an examination. According to FIG. 7 a series of photo-multipliers $31_1$, $31_2$ are used instead of the single photo-multiplier 31 of FIG. 6. The photo-multipliers have a common reference scintillator 29 and light pipe 30. Each photo-multiplier has individual collimators between it and the source of X-rays 20, the collimators being denoted by the references $21_1$ and $23_1$ in the case of the photo-multiplier $31_1$. With this form of the invention the oscillation of the photo-multipliers and the associated collimating systems need be only a fraction of that of the apparatus shown in FIG. 6a. The photo multipliers could also be arranged slightly displaced downwards so that six pictures can be taken at one time. As indicated, in FIG. 8a the outputs of the photo-multipliers $31_1$, $31_2$ are applied to a series of amplifiers $41_1$, $41_2$ . . . and thence to a serialiser 42 which feeds the plurality outputs of the amplifiers in series to an analogue-to-digital converter 43. The digital output of the converter 43 is fed to a magnetic tape recorder 44 and thence to a digital computer 45 which is programmed to compute the absorption coefficients of the elements of a matrix notionally superimposed on the body 32 under examination. The co-efficients computed by the computer 45 are recorded by a further magnetic tape recorder 46 from which they are applied to a picture selector control device 47. The tape produced by the computer 45 may be replaced on the tape recorder 44, recorder 46 then being unnecessary. The output of device 47 is applied to a digital-to-analogue converter 48 and thence to a control circuit 49 which has a manual knob 50 for controlling the position of the contrast window and another manual knob 51 for controlling the width of the window. The output of the control circuit 49 is fed to a display unit 52 which includes a cathode ray tube having a screen 53. The display unit 52 is arranged to respond to the output signals of the digital computer to build up a visual representation of the section of the object under examination. The term "window" denotes the range of signal amplitudes which is applied to the unit 52 to form the display, and the unit 52 is thus such that different absorption coefficients can be displayed on a scale from black to white. The contrast window width control knob 51 enables the full scale black to white to be occupied by a small or large critical range of absorption coefficients, and the observer may vary the position of the window by manipulation of the control knob 50. FIGS. 8b, 8c and 8d illustrate the effect of varying the width and position of the window. The values of the absorption coefficients are indicated on the vertical scale in these Figures. FIG. 8b illustrates the case in which a wide window is used, that is to say in which the black/white range covers a wide range of values of absorption coefficients. If signals exceeding peak white are removed, for example by limiting, only tissue and tumour will show on the picture. However, as the absorption coefficient of tumour is only 10 percent greater than that of tissue both will appear as grey and it will be difficult to distinguish between them. FIG. 8c shows the effect of using a narrow window. In this case it is not possible to distinguish between bone and tumour but it is easy to distinguish tissue from both bone and tumour. If signals exceeding peak white are removed, only tissue will show up on the picture.

FIG. 8d shows the effect of altering the position of the narrow window used in FIG. 8c. The tumour now appears as grey while tissue exceeds peak black and bone exceeds peak white. Consequently if signals exceeding peak white and peak black are removed, only the tumour will show up in the picture. It can therefore be seen that by manipulation of the width control knob 51 and position control knob 50 the operator can eliminate from the final picture everything except the material which he wishes to examine. The display unit may also include means for displaying up to four representations of different sections at one time and provision may be made to enable the observer to dwell on one representation. A long after glow tube may be used the picture being replenished by a continuous backwards and forwards pass of the tape deck. The digital computer 45 may be an on line computer and may be remote from the magnetic tape recorders 44 and 46 being connected thereto by suitable lines or the like. Alternatively the magnetic tape recorders may be arranged to store information for computation and display at desired times.

In some cases it may be more convenient to have a direct display. This could employ a cathode ray tube store for storing the data in analogue form. Preferably, the tube should have large values of screen capacity so that the stored information may be interrogated without causing any significant change in its value. Such tubes are commonly used to provide "bright" radar displays. The summation and computing of values received from the cathode ray tube may be carried out by a simple accumulator and comparator operating a serial mode, and the output fed back to the cathode ray tube to give the necessary small additions to the change built up over the screen. A digital computer would therefore be unnecessary.

It will be appreciated that in the examples illustrated in FIGS. 6a, 6b and 7 the rays or beams of each set which are passed through the body traverse discrete paths disposed along respective radii of a sector of a circle centred at the source 20. Moreover, as the equipment rotates, the locus of the centres of the circles (from which radiate the paths traversed by the successive sets of rays or beams) generate an arc or circle lying outside the body.

In the examples of the invention which have been described, the detecting means detect the transmission of radiation through a plurality of paths which are coplanar with the slice being examined. In some cases however some at least of the paths may be oblique to the plane of the slice and such oblique paths when it is desired used when it is desired to determine the transmission or absorption coefficients of the elements of a three dimensional matrix.

An important advantage of the invention is that the total exposure of the body is less per picture as only a narrow slit is irradiated whereas in other proposed methods an area equal to the size of the picture is exposed. In addition, the invention uses a method of decyphering the received information which is much more efficient than other methods so that more information is obtained for the same dosage.

What I claim is:

1. A method of examining at least part of the interior of a body using penetrating radiation such as X or γ rays, comprising the steps of:

a. transmitting radiation from an external source through the body in a plurality of rays traversing a plurality of respective paths to establish a first set of rays in a planar slice of said body, the cross-sectional dimensions of each ray being small in relation to the dimensions of the body;

b. transmitting radiation from said external source in further sets of rays similar to said first set of rays;

c. one of said sets being disposed in said planar slice at an initial angle or initial mean angle and the others of said sets of rays being disposed in said planar slice at angles or mean angles different from each other and from said initial angle or initial mean angle;

d. the sets of rays being such that every element of a two-dimensional matrix of elements of the body in said planar slice is intersected by a group of said rays, the group of rays being different for the different elements of the matrix, each element of said matrix having dimensions of the order of magnitude of the cross-sectional dimensions of said rays;

e. deriving from each ray emerging from the body a discrete output signal representing the sum of the transmissions or absorptions of the elements of the body intersected by the ray, thereby to derive sets of discrete output signals corresponding to the sets of rays indicative of the transmission or absorption of each element of said matrix; the number of output signals which are derived from said rays being sufficient to obtain by a process of successive approximations substantial discrimination between the transmission or absorption coefficients of neighboring elements of the matrix;

f. deriving from said output signals, by a process of successive approximations during which the approximation of the transmission or absorption coefficient of each element of the matrix is adjusted a number of times, resultant signals representing the transmissions or absorptions of the elements of said matrix, the derivation of said resultant signals including the steps of:

i. deriving an error signal responsive to a comparison of each discrete output signal and a reconstruction of said output signal predicated upon preceding approximations of the transmissions or absorptions of the elements of said matrix from which the said output signal was derived; and ii. adjusting the respective approximations in response to said error signal;

g. producing in response to said resultant signals a representation of the transmissions or absorptions of said elements of the slice of the body.

2. A method according to claim 1 in which the steps of transmitting radiation are carried out utilizing a total number of rays substantially greater than the number of elements of said matrix.

3. A method according to claim 1 further including the steps of continuing the process of successive approximations for deriving said resultant signals until said discrete output signals have been utilized several times.

4. A method according to claim 3 further including the steps of multiplying the error signals derived during successive utilizations of said discrete output signals by a factor which is less than unity.

5. A method according to claim 4 further including the step of reducing the factor successively for successive utilizations.

6. A method according to claim 1 in which the step of deriving resultant signals is carried out utilizing the discrete output signals taken in sets.

7. A method according to claim 1 in which the step of adjusting the approximations is carried out by distributing said error signal among the respective approximations.

8. A method according to claim 1 in which the angular separation of different sets of rays is sufficiently small that the elements of the matrix traversed by respective rays at neighboring angles in adjacent sets include a plurality of common elements.

9. A method according to claim 8 in which in deriving said resultant signals the sets of output signals are selected in such order as to correspond to sets of rays which are further apart in angle than adjacent sets of rays.

10. A method according to claim 1 in which the steps of transmitting radiation through the body are carried out such that each set of rays is disposed along respective radii of a respective sector of a circle, the locus of the centres of said circles generating a circle or arc lying outside said body.

11. A method according to claim 1 wherein step (a) is carried out by scanning said source linearly with respect to said body to establish the first set of rays traversing said body at the initial angle in the planar slice of said body, and step (b) is carried out by repeating said linear scanning of said source at a plurality of different angles around the plane, to establish the further sets of rays disposed at angles different from each other and from said initial angle.

12. A method of examining at least part of the interior of a body using penetrating radiation such as X or γ rays, comprising the steps of:
   a. transmitting radiation from an external source through the body in a plurality of rays traversing a plurality of respective paths to establish a first set of rays in a planar slice of said body, the cross-sectional dimensions of each ray being small in relation to the dimensions of the body;
   b. transmitting radiation from said external source in further sets of rays similar to said first set of rays;
   c. one of said sets of rays being disposed in said planar slice at an initial angle or initial mean angle and the others of said sets of rays being disposed in said planar slice at angles or mean angles different from each other and from said initial angle or initial mean angle;
   d. the sets of rays being such that every element of a two-dimensional matrix of elements of the body in said planar slice is intersected by a group of said rays, the group of rays being different for the different elements of the matrix, each element of said matrix having dimensions of the order of magnitude of the cross-sectional dimensions of said rays;
   e. deriving from each ray emerging from the body a discrete output signal representing the sum of the transmissions or absorptions of the elements of the body intersected by the ray, thereby to derive sets of discrete output signals corresponding to the sets of rays indicative of the transmission or absorption of each element in said matrix, the number of output signals which are derived from said rays being sufficient to obtain by a process of successive approximations substantial discrimination between the transmission or absorption coefficients of neighboring elements of the matrix;
   f. providing stored weighting signals related to different intercepts of the elements of said matrix by the rays in different sets;
   g. deriving resultant signals representing the transmissions or absorptions of the elements of said matrix, the derivation of said resultant signals including the steps of successively approximating said resultant signals in response to said output signals and respective weighting signals;
   h. deriving in response to the resultant signals a representation of the transmissions or absorptions of the elements of the slice of the body.

13. A method of examining at least part of the interior of a body using penetrating radiation such as X or γ rays, comprising the steps of:
   a. transmitting radiation from an external source through the body in a plurality of rays traversing a plurality of respective paths to establish a first set of rays in a planar slice of said body, the cross-sectional dimensions of each ray being small in relation to the dimensions of the body;
   b. transmitting radiation from said external source in further sets of rays similar to said first set of rays;
   c. one of said sets of rays being disposed in said planar slice at an initial angle or initial mean angle and the others of said sets of rays being disposed in said planar slice at angles or mean angles different from each other and from said initial angle or initial mean angle;
   d. the sets of rays being such that every element of a two-dimensional matrix of elements of the body in said planar slice is intersected by a group of said rays, the group of rays being different for the different elements of the matrix, each element of said matrix having dimensions of the order of magnitude of the cross-sectional dimensions of said rays;
   e. deriving from each ray emerging from the body a discrete output signal representing the sum of the transmissions or absorptions of the elements of the body intersected by the ray, thereby to derive sets of discrete output signals corresponding to the sets of rays indicative of the transmission or absorption of each element in said matrix, the number of output signals which are derived from said rays being sufficient to obtain by a process of successive approximations substantial discrimination between the transmission or absorption coefficients of neighboring elements of the matrix;
   f. providing stored weighting signals related to different intercepts of the elements of said matrix by the rays in different sets;
   g. deriving from said discrete output signals, by a process of successive approximations, resultant signals representing the transmissions or absorptions of the elements of said matrix, the derivation of the resultant signals including the steps of:
      i. producing for comparison with each output signal a reconstruction of said output signal being the sum of preceding approximations of the transmissions or absorptions of the elements of the matrix from which the said output signal was derived, multiplied by the respective weighting signals;

ii. deriving an error signal responsive to a comparison of each output signal and said reconstruction thereof;

iii. distributing said error signal among the respective approximations so as to improve said approximations;

h. providing a representation of the transmissions or absorptions of the elements of said slice of the body in response to said resultant signals.

14. A method according to claim 13 further including the step of continuing the process of successive approximations for deriving said resultant signals until the sets of discrete output signals have been utilized several times.

15. A method according to claim 14 further including the step of multiplying the error signals derived during successive utilizations of said sets of output signals by a factor which is less than unity.

16. A method of examining at least part of the interior of a body using penetrating radiation such as X or γ rays, comprising the steps of:

a. transmitting radiation from an external source through the body in a plurality of rays traversing a plurality of respective paths to establish a first set of rays in a planar slice of said body, the cross-sectional dimensions of each ray being small in relation to the dimensions of the body;

b. transmitting radiation from said external source in further sets of rays similar to said first set of rays;

c. one of said sets of rays being disposed in said planar slice at an initial angle or initial mean angle and the others of said sets of rays being disposed in said planar slice at angles or mean angles different from each other and from said initial angle or initial mean angle;

d. the sets of rays being such that every element of a two-dimensional matrix of elements of the body in said planar slice is intersected by a group of said rays, the group of rays being different for the different elements of the matrix, each element of said matrix having dimensions of the order of magnitude of the cross-sectional dimensions of said rays;

e. deriving from each ray emerging from the body a discrete output signal representing the sum of the transmissions or absorptions of the elements of the body intersected by the ray, thereby to derive sets of discrete output signals corresponding to the sets of rays indicative of the transmission or absorption of each element of said matrix, the number of output signals which are derived from said rays being sufficient to obtain by a process of successive approximations substantial discrimination between the transmission or absorption coefficients of neighboring elements of the matrix;

f. deriving in response to said discrete output signals, taken individually, by a process of successive approximations during which the approximation of the transmission or absorption coefficient of each element of the matrix is adjusted a number of times, resultant signals indicative of the transmissions or absorptions of said elements of the slice of the body; and g. deriving in response to the resultant signals obtained from said process of successive approximations a representation of the transmissions or absorptions of the elements of said slice of the body.

17. A method of examining at least part of the interior of a body using penetrating radiation such as X or γ rays, comprising the steps of:

a. transmitting radiation from an external source through the body in a plurality of rays traversing a plurality of respective paths to establish a first set of rays in a planar slice of said body, the cross-sectional dimensions of each ray being small in relation to the dimensions of the body;

b. transmitting radiation from said external source in further sets of rays similar to said first set of rays;

c. one of said sets of rays being disposed in said planar slice at an initial angle or initial mean angle and the others of said sets of rays being disposed in said planar slice at angles or mean angles different from each other and from said initial angle or initial mean angle;

d. the sets of rays being such that every element of a two-dimensional matrix of elements of the body in said planar slice is intersected by a group of said rays, the group of rays being different for the different elements of the matrix, each element of said matrix having dimensions of the order of magnitude of the cross-sectional dimensions of said rays;

e. deriving from each ray emerging from the body a discrete output signal representing the sum of the transmissions or absorptions of the elements of the body intersected by the ray, thereby to derive sets of discrete output signals corresponding to the sets of rays indicative of the transmission or absorption of each element of said matrix, the number of output signals which are derived from said rays being sufficient to obtain by a process of successive approximations substantial discrimination between the transmission or absorption coefficients of neighboring elements of the matrix;

f. deriving from said output signals, by a process of successive approximations during which the approximation of the transmission or absorption coefficient of each element of the matrix is adjusted a number of times, resultant signals representing the transmissions or absorptions of the elements of said matrix, the derivation of said resultant signals including the steps of:

i. deriving an error signal responsive to a comparison of each discrete output signal and a reconstruction of said output signal predicated upon preceding approximations of the transmissions or absorptions of the elements of said matrix from which the said output signal was derived; and ii. adjusting the respective approximations in response to said error signal, whereby a representation of the transmissions or absorptions of the elements of said slice of the body can be derived.

18. Apparatus for examining at least part of a body using radiation such as X or γ rays, comprising:

a. means including a source of radiation disposed to transmit radiation through a body to be examined, and detecting means in operative relationship with said source for detecting radiation from said source transmitted through said body in at least one ray of small cross-sectional area relative to the dimensions of the body;

b. controlling means for controlling said source and said detecting means relative to said body for transmitting through a planar slice of said body to said detecting means a plurality of rays constituting a first set of rays and transmitting through said planar slice of said body further sets of rays similar to said first set of rays, said sets of rays being disposed in said slice at angles or mean angles different from each other;

c. said sets of rays being such that every element of a two-dimensional matrix of elements of said body in said planar slice is intersected by a group of rays, the group of rays being different for the different elements of the matrix, the elements of said matrix having dimensions of the order of magnitude of the cross-sectional dimensions of said rays;

d. circuit means coupled to said detecting means for deriving from each ray a discrete output signal representing the sum of the transmissions or absorptions of the elements of the body intersected by the respective ray, thereby to derive sets of output signals corresponding to the sets of rays indicative of the transmission or absorption of each element of said matrix, the number of output signals which are derived from said rays being sufficient to obtain by a process of successive approximations substantial discrimination between the transmission or absorption coefficients of neighboring elements of the matrix;

e. arithmetic means organized to respond to said discrete output signals and to produce, by a process of successive approximations during which the approximation of the transmission or absorption coefficient of each element of the matrix is adjusted a number of times, resultant signals representing the transmissions or absorptions of the elements of the matrix, said arithmetic means including means for deriving an error signal responsive to a comparison of each output signal and a reconstruction of said output signal predicated upon preceding approximations of the transmissions or absorptions of the elements of the matrix from whic the said output signal was derived and for adjusting the respective approximations in response to said error signal; and f. means responsive to said resultant signals for producing a representation of the transmissions or absorptions of said elements of said slice of the body.

19. Apparatus according to claim 18, wherein said controlling means controls said source and said detecting means relative to said body to transmit the sets of rays in said planar slice such that the rays of each set are disposed along respective radii of a respective sector of a circle, the locus of the centres of said circles generating a circle or arc lying outside said body.

20. Apparatus according to claim 18, wherein said arithmetic means includes:

i. means for storing preceding approximations of the transmissions or absorptions of the elements of said matrix;

ii. means for deriving for each discrete output signal a reconstruction of said output signal predicated upon preceding approximations;

iii. means for deriving an error signal responsive to a comparison of each discrete output signal and said reconstruction thereof;

iv. means for adjusting the respective approximations stored in said storing means in response to said error signals.

21. Apparatus according to claim 18 further including storage means for storing said discrete output signals.

22. Apparatus according to claim 21 wherein said arithmetic means further includes means for selecting said stored discrete output signals in sets from said storage means.

23. Apparatus according to claim 22 wherein said controlling means is arranged to cause the angular separation of the different sets of rays to be sufficiently small that the elements of the matrix traversed by respective rays at neighboring angles in adjacent sets include a plurality of common elements and wherein said means for selecting said output signals in sets is arranged to select the sets in such order as to correspond with sets of rays which are further apart in angle than adjacent sets of rays.

24. Apparatus according to claim 18 further comprising a store of weighting signals related to the intercepts of the elements of the matrix by the rays in different sets determined by said controlling means and wherein said means for deriving an error signal comprises means for summing the preceding approximations of the transmissions or absorptions of the elements of the matrix from which the respective output signal was derived, multiplied by the respective weighting signals.

25. Apparatus according to claim 18 wherein controlling means for controlling said source and said detecting means linearly scans said body to establish said first set of rays and repeats said linear scanning of said source and said detecting means at a plurality of different angles round said plane to establish said further sets of rays.

26. Apparatus for examining at least part of a body using radiation such as X or $\gamma$ rays, comprising:

a. means including a source of radiation disposed to transmit radiation through a body to be examined, and detecting means in operative relationship with said source for detecting radiation from said source transmitted through said body in at least one ray of small cross-sectional area relative to the dimensions of the body;

b. controlling means for controlling said source and said detecting means relative to said body for transmitting through a planar slice of said body to said detecting means a plurality of rays constituting a first set of rays and for transmitting through said planar slice of said body to said detecting means further sets of rays similar to said first set of rays, said sets of rays being disposed in said slice at angles or mean angles different from each other;

c. said sets of rays being such that every element of a two-dimensional matrix of elements of said body in said planar slice is intersected by a group of rays, the group of rays being different for the different elements of the matrix, the elements of said matrix having dimensions of the order of magnitude of the cross-sectional dimensions of said rays;

d. circuit means coupled to said detecting means for deriving from each ray a discrete output signal representing the sum of the transmissions or absorptions of the elements of the body intersected by the respective ray, thereby to derive sets of output signals corresponding to the sets of rays indicative of the transmission or absorption of each element of said matrix;

e. a store for weighting signals related to the intercepts of the elements of said matrix by the rays in different sets determined by said controlling means;

f. arithmetic means for deriving resultant signals representing the transmissions or absorptions of the elements of said matrix, said arithmetic means being organized to derive said resultant signals by a process of successive approximations in response to said output signals and said weighting signals;

g. means responsive to said resultant signals for producing a representation of the transmissions or absorptions of said elements of said slice of said body.

27. Apparatus for examining at least part of a body using radiation such as X or γ rays, comprising:

a. means including a source of radiation disposed to transmit radiation through a body to be examined, and detecting means in operative relationship with said source for detecting radiation from said source transmitted through said body in at least one ray of small cross-sectional area relative to the dimensions of the body;

b. controlling means for controlling said source and said detecting means relative to said body for transmitting through a planar slice of said body to said detecting means a plurality of rays constituting a first set of rays and for transmitting through said planar slice of said body further sets of rays similar to said first set of rays, said sets of rays being disposed in said slice at angles or mean angles different from each other;

c. said sets of rays being such that every element of a two-dimensional matrix of elements of said body in said planar slice is intersected by a group of rays, the group of rays being different for the different elements of the matrix, the elements of said matrix having dimensions of the order of magnitude of the cross-sectional dimensions of said rays;

d. circuit means coupled to said detecting means for deriving from each ray a discrete output signal representing the sum of the transmissions or absorptions of the elements of the body intersected by the respective ray, thereby to derive from the sets of rays corresponding sets of output signals indicative of the transmissions or absorptions of each element of the matrix, the number of output signals which are derived from said rays being sufficient to obtain by a process of successive approximations substantial discrimination between the transmission or absorption coefficients of neighboring elements of the matrix;

e. arithmetic means for deriving resulting signals indicative of the transmissions or absorptions of the elements of the matrix in response to said discrete output signals, taken individually, by a process of successive approximations during which the approximation of the transmission or absorption coefficient of each element of the matrix is adjusted a number of times;

f. means responsive to resultant signals obtained from said process of successive approximations for producing a representation of the transmissions or absorptions of the elements of said slice of the body.

28. Apparatus for examining at least part of a body using radiation such as X or γ rays, comprising:

a. means including a source of radiation disposed to transmit radiation through a body to be examined, and detecting means in operative relationship with said source for detecting radiation from said source transmitted through said body in at least one ray of small cross-sectional area relative to the dimensions of the body;

b. controlling means for controlling said source and said detecting means relative to said body for transmitting through a planar slice of said body to said detecting means a plurality of rays constituting a first set of rays and for transmitting through said planar slice of said body further sets of rays similar to said first set of rays, said sets of rays being disposed in said slice at angles or mean angles different from each other;

c. said sets of rays being such that every element of a two-dimensional matrix of elements of said body in said planar slice is intersected by a group of rays, the group of rays being different for the different elements of the matrix, the elements of said matrix having dimensions of the order of magnitude of the cross-sectional dimensions of said rays;

d. circuit means coupled to said detecting means for deriving from each ray a discrete output signal representing the sum of the transmissions or absorptions of the elements of the body intersected by the respective ray, thereby to derive from the sets of rays corresponding sets of discrete output signals indicative of the transmission or absorption of each element of said matrix, the number of output signals which are derived from said rays being sufficient to obtain by a process of successive approximations substantial discrimination between the transmission or absorption coefficients of neighboring elements of the matrix;

e. arithmetic means organized to respond to said discrete output signals and to produce by a process of successive approximations during which the approximation of the transmission or absorption coefficient of each element of the matrix is adjusted a number of times, resultant signals representing the transmissions or absorptions of the elements of the matrix, said arithmetic means including means for deriving an error signal responsive to a comparison of each output signal and a reconstruction of said output signal predicated upon preceding approximations of the transmissions or absorptions of the elements of the matrix from which the said output signal was derived and for adjusting the respective approximations in response to said error signal, whereby a representation of the transmissions or absorptions of the elements of said slice of the body can be derived.

* * * * *